US009775082B1

(12) United States Patent
Chakraborty et al.

(10) Patent No.: US 9,775,082 B1
(45) Date of Patent: Sep. 26, 2017

(54) LINK ADAPTATION IN WIRELESS COMMUNICATION USING MULTIPLE SIMS

(71) Applicant: Intel IP Corporation, Santa Clara, CA (US)

(72) Inventors: Soumen Chakraborty, Bangalore (IN); Lakshmipathi Yangala, Bangalore (IN)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/384,621

(22) Filed: Dec. 20, 2016

(51) Int. Cl.

| | |
|---|---|
| ***H04W 36/00*** | (2009.01) |
| ***H04W 52/36*** | (2009.01) |
| *H04W 88/06* | (2009.01) |
| *H04W 88/08* | (2009.01) |

(52) U.S. Cl.
CPC ... *H04W 36/0094* (2013.01); *H04W 36/0072* (2013.01); *H04W 52/365* (2013.01); *H04W 88/06* (2013.01); *H04W 88/08* (2013.01)

(58) Field of Classification Search
CPC ............... H04W 52/365; H04W 52/34; H04W 36/0088; H04W 52/367; H04W 72/1284; H04W 72/0473; H04W 36/0072
See application file for complete search history.

(56) References Cited

U.S. PATENT DOCUMENTS

| | | | | |
|---|---|---|---|---|
| 2012/0140743 A1* | 6/2012 | Pelletier | H04W 72/0453 | 370/335 |
| 2012/0213149 A1* | 8/2012 | Chakraborty | H04W 52/365 | 370/328 |
| 2013/0028231 A1* | 1/2013 | Zhang | H04W 52/146 | 370/329 |
| 2014/0241197 A1* | 8/2014 | Baldemair | H04W 52/146 | 370/252 |
| 2015/0003345 A1* | 1/2015 | Kuo | H04W 52/365 | 370/329 |
| 2015/0282104 A1* | 10/2015 | Damnjanovic | H04W 52/365 | 455/522 |
| 2016/0262119 A1* | 9/2016 | Kim | H04L 5/001 | |

* cited by examiner

*Primary Examiner* — Nizar Sivji
(74) *Attorney, Agent, or Firm* — Schiff Hardin LLP

(57) ABSTRACT

A method and apparatus for reporting power headroom to a base station in a user equipment having two subscriber identity modules (SIMs). In a user equipment with a dual connectivity SIM, the power headroom report (PHR) to a first base station includes a second power headroom value of the dual connectivity connection reduced by the power headroom value of the second SIM. The PHR to the second base station includes the first power headroom value reduced by the power headroom value of the second SIM. In a single connectivity, dual SIM user equipment, the PHR includes an average power headroom value of the other SIM.

13 Claims, 7 Drawing Sheets

LINK ADAPTATION IN WIRELESS COMMUNICATION USING MULTIPLE SIMS

TECHNICAL FIELD

The present disclosure relates generally to a method and apparatus for wireless communication using a device having multiple SIMs (subscriber information modules), and more particularly to a method and apparatus for link adaptation in a multiple SIM wireless communication device.

BACKGROUND

Many wireless communication devices such as cellular phones, smartphones, tablet computers, or other devices use a SIM (subscriber information modules) to store the subscriber's telephone number and other subscriber information, such as contact lists, as well as network information for the subscriber's service provider. Some wireless communication devices permit use of two or more SIMs in the device. A user may use a dual SIM device to make and receive calls or send and receive texts and other data on two different telephone numbers, on two different subscriber accounts, or over two different networks simultaneously. For example, a traveler may retain a SIM in the device for the traveler's home country telephone number, and may install a second SIM into the device for a local telephone number while traveling in a foreign country. The local account SIM may provide service at local rates, particularly for calls within the foreign country, while the home account SIM permits the device to receive calls on the home country number. By contrast, a single SIM device would disable the device for use with the home country number if the SIM were replaced with a SIM for service within the foreign country. In a second example, a user may choose to assign one SIM in the dual SIM device to a business telephone number or account and a second SIM to a personal telephone number or account, so that the user may use the same device for both accounts.

Some wireless communication devices provide dual connectivity wherein the wireless device connects to two eNodeBs (or base stations) using a single user account and a single SIM. Dual connectivity improves data throughput and robustness. The dual connectivity is carried out by a single SIM in the device communicating with two eNodeBs within the same network.

Wireless devices are limited in the amount of power they may use for transmitting or uplinking data. A wireless device that is communicating with an eNodeB (or base station) may report to the eNodeB on the amount of power available for uplinking data from the wireless device to the eNodeB. This report is referred to as a power headroom report (PHR). Upon receiving the power headroom report, the eNodeB may condition the communication channel by allocating resources to the communication link that are appropriate for the reported power, setting data communication rates, setting noise canceling resources, and the like.

The 3GPP standard provides that a power headroom report from a user device to an eNodeB for a first dual connectivity connection may include in the report the power being used for the second dual connectivity connection by that same SIM to the second eNodeB. Both of the eNodeBs are in the same network.

DETAILED DESCRIPTION

Figure 1:
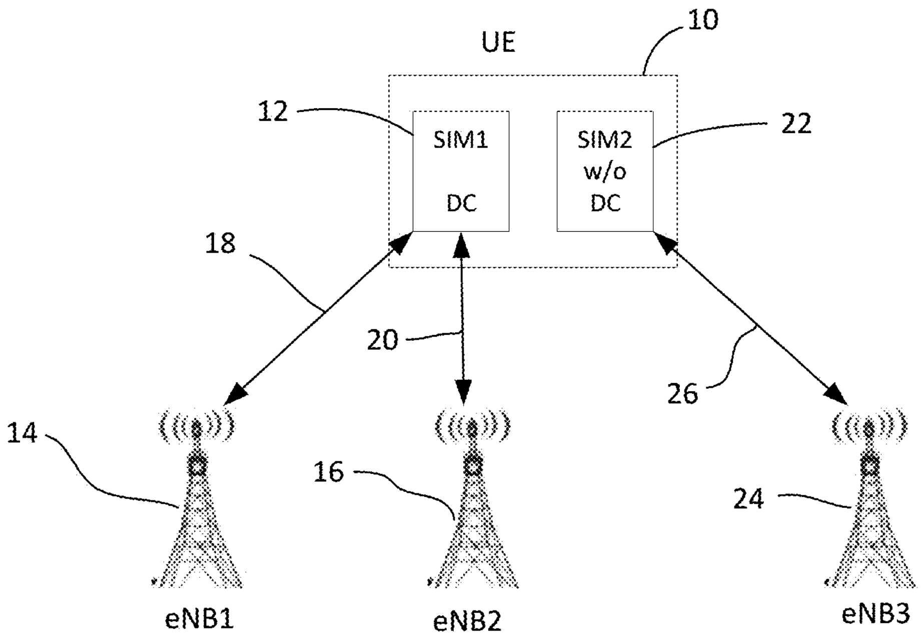
FIG. 1 is a functional block diagram showing a user equipment communicating with three eNodeB base stations using dual connectivity and dual SIMs.

A user device or user equipment that communicates with a base station or eNodeB may send a power headroom report to the base station or eNodeB so that the base station or eNodeB may allocate resources to the communication channel to be used with that user equipment that is appropriate for the power available in the user equipment for the communication. For user equipment that includes dual SIMs (subscriber information modules) so that wireless communications may be carried out on two channels, the user equipment may provide a power headroom report from the first SIM to a base station or eNodeB that reports the power available to the first SIM and also accounts for the power being used by the second SIM for communications to a separate base station or eNodeB. The second SIM may be used to communicate with an eNodeB in a separate network from the network over which the first SIM is communicating.

Some user equipment use SIMs that permit the SIM to connect to two base stations or eNodeBs. The power headroom report may report power used in a dual SIM device that also utilizes dual connectivity for one or both of the SIMs.

In a multi-SIM scenario, the eNBs (eNodeBs) do independent scheduling, and the eNB scheduler is not aware of the possible uplink transmission on the other SIM. This causes performance degradation in UL (uplink) link adaptation and Tx (transmit) power control when simultaneous UL (uplink) transmissions happen on two SIMs. Link adaptation is performed by an algorithm which estimates the modulation, coding, transmit power, and other characteristics of the communication link to suit the wireless medium being used for the communication.

The LTE (long term evolution) dual connectivity feature (which was introduced in release 12 of the 3GPP standard) provides that a user equipment may be configured to communicate with two eNBs to minimize the complexity at the network side by relaxing the necessity of ideal backhaul between the two eNBs and in this scenario, the schedulers in the two eNBs are independent. Ideal backhaul refers to minimal latency in the communication between the two eNBs. In dual connectivity, to avoid the over-utilization of the user equipment's transmit power, the power head room report includes reporting to both the eNBs using dualConnectivityPHR (Ref. clause 6.1.3.6b TS 36.321).

Through the power head room report in dual connectivity, each eNB becomes aware of the power head room in the other eNB and if any power scaling is applied due to over utilization of the user equipment's maximum transmit power. Even if there is no uplink allocation in a certain eNB, a virtual PHR (power headroom report) is included to indicate the path loss seen in the eNB where there is no allocation. From this, the eNB calculates the transmit power requirements of the other eNB and estimates how frequently allocations are colliding and selects the uplink allocation size and MCS (modulation and coding scheme) accordingly.

According to an aspect of the present method and apparatus, the contents of the power headroom report accounts for the transmit power required for the other SIM in a "dual connectivity+dual SIM" scenario. According to another aspect, the power headroom report accounts for the transmit power required for the other SIM of a dual SIM user equipment which not using dual connectivity and for which dual connectivity is not configured. Both of these aspects may be implemented without requiring a change in the standards.

For the dual connectivity feature, introduced in Release 12 of the LTE standards, a framework is provided to report power head room of all uplink (UL) carriers to both the MeNB (master eNodeB) and the SeNB (slave eNodeB). The eNB scheduler can adjust the allocations based on the power requirements of the other eNBs used for the dual connectivity operation.

For user equipment that provides both dual connectivity and dual SIM communications, the present method includes a modified dual connectivity power headroom report (PHR) that accounts for the dual connectivity power headroom and also accounts for the instantaneous transmit power used in the second SIM. The eNB scheduler accounts for the transmit power and allocation of the eNB from its own carrier power head room report, and the contents of the power headroom for the other eNB accounts for both the transmit power to the other eNB used in the dual connectivity connection and for the transmit power used for communication by the second SIM. In particular, the power headroom content that reports the power used for the other eNodeB in the dual connectivity communication is modified to include the transmit power used by the second SIM. The DualConnectivityPHR is modified. The scheduler of the eNodeBs will use the modified power headroom report and provide the same performance in a dual SIM communication as in the dual connectivity communications.

When dual connectivity is not configured for the user equipment, the DualConnectivityPHR is not available. For user equipment that is not configured for dual connectivity, a modification is made of the legacy power headroom report that is sent to the same eNodeB to account for the average transmit power used in the second SIM for the allocated sub frames. This modification does not require that the standards be changed.

Referring first to FIG. 1, a user equipment (UE) 10 may be a smart phone, a tablet computer, a laptop or notebook computer, a mobile telephone, a personal information device, or other device. In an exemplary aspect, the user equipment can include processor circuitry that is configured to perform one or more functions and/or operations of the user equipment. The user equipment 10 includes a first SIM (subscriber information module) 12 that is configured for dual connectivity (DC). The first SIM (SIM1) is capable of wirelessly communicating with a first base station or eNodeB 14 and with a second base station or eNodeB 16, as indicated by arrows 18 and 20, respectively. The first eNodeB 14 (eNB1) and the second eNodeB 16 (eNB2) are in the same network in the example. The user equipment 10 includes a second SIM 22. The second SIM 22 (SIM2) is not configured for dual connectivity in the example. The second SIM 22 may be configured for dual connectivity in some aspects. The second SIM 22 may wirelessly communicate with a third eNodeB 24, which may also be referred to as a further eNodeB or base station, as indicated by the arrow 26.

The total power available to the user equipment 10 for wirelessly transmitting data from the device may be limited, for example by regulations and/or by the power source such as a battery or other power supply. The transmission of data over each of the wireless communications 18, 20 and 26 should account for the limited power available.

Figure 2:
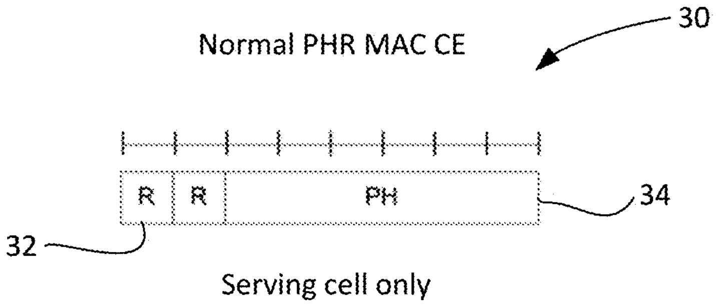
FIG. 2 is a schematic diagram showing a power headroom report for a single eNodeB connection.

In FIG. 2, a power headroom report 30 is shown for a single wireless communication channel as sent from a user equipment to an eNodeB. The power headroom report includes a power MAC CE (media access control) (control element) that includes two R bits (reserved bits) 32 followed by a series of six bits 34 defined as a PH field and providing a value that is an estimate of the PH (power headroom), the level in dB under or over what the user equipment is allowed to transmit. For example, the level 34 may be reported in values 0-64 corresponding to ranges of power dB as mapped to a look up table.

Figure 3:
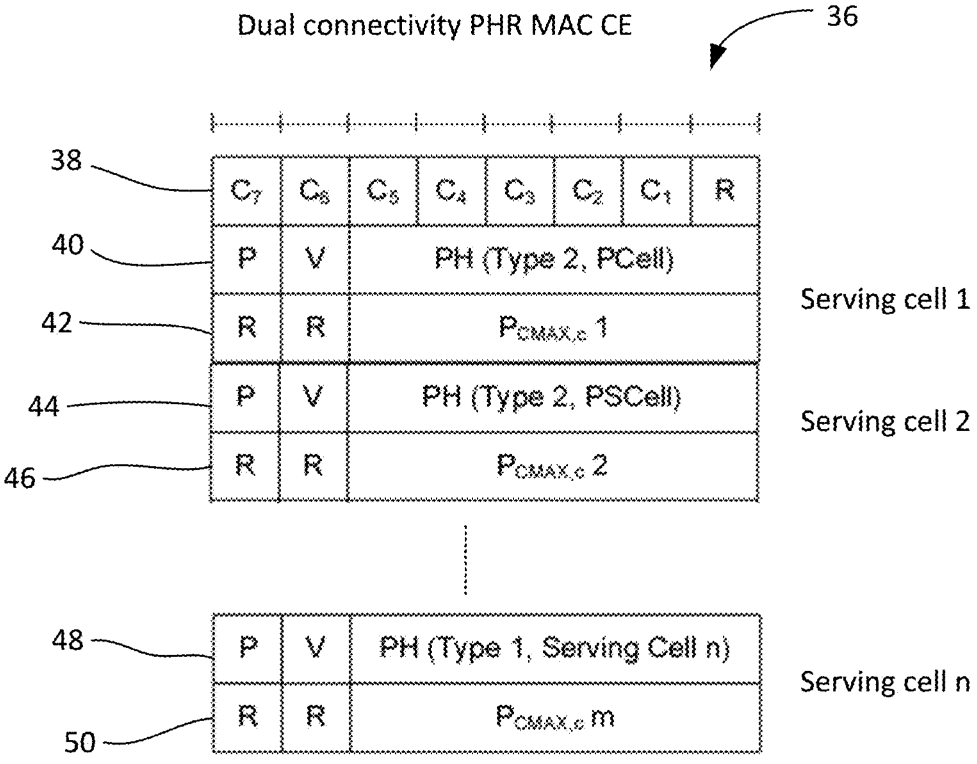
FIG. 3 is a schematic diagram showing a power headroom report for a dual connectivity connection.

FIG. 3 shows a power headroom report 36 for a dual connectivity situation. The power headroom report 36 includes a first octet 38 of eight bits having seven C bits and a reserved bit, followed by a second octet 40 of a P bit, a V bit and six bits with power headroom (PH) information for the type 2, PCell. A third octet 42 of two reserved bits and a Pcmax c 1 value in the right most six bits. The octets 40 and 42 serve the first cell of the dual connectivity connection. An octet 44 includes P and V bits followed by power headroom information for the type 2, PSCell. The octet 46 includes two reserved bits (R) and six bits with Pcmax c2 information. The octets 44 and 46 serve the second cell. If more cells are used in the dual connectivity communications, additional pairs of octets are provided, for example, an octet 49 including P and V bits with a PH string of type 1, serving cell n information and an octet 50 of two reserved bits with a six bit string reporting Pcmax c n.

Figure 4:
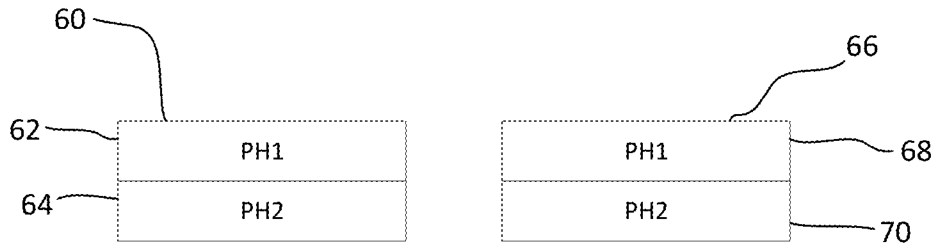
FIG. 4 is a block diagram of power headroom reports including dual connectivity power headroom information.

With reference to FIG. 4, a power headroom report (PHR) for a dual connectivity device provides a first power headroom report 60 to the first eNodeB. The first PHR 60 includes a first part 62 (PH1), which reports the power headroom of the first connection to the first eNodeB. Further, the first PHR 60 includes a second part 64 (PH2) which reports to the first eNodeB the power headroom of the second connection to the second eNodeB. A power headroom report 66 is sent to the second eNodeB and includes a first part 68 (PH1) that reports the power headroom for the first connection to the first eNodeB and a second part 70 (PH2) that reports the power headroom for the second connection to the second eNodeB.

Figure 5:
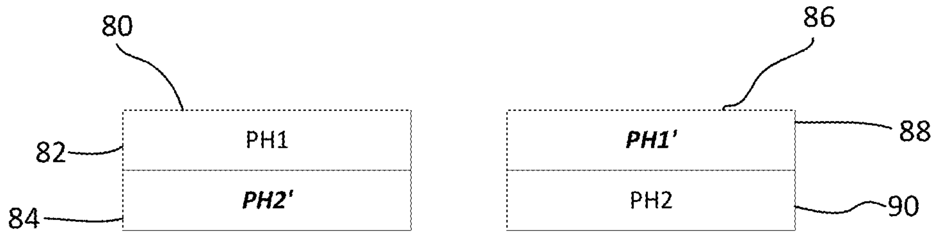
FIG. 5 is a block diagram of a power headroom reports including modified dual connectivity power headroom information.

In FIG. 5, is shown a power headroom report 80 that is provided by a dual connected SIM to a first eNodeB. The power headroom report 80 includes a first part 82 (PH1) that reports the power head room for the SIM to transmit to the first eNodeB. This reports the same information as in FIG. 4. The power headroom report 80 includes a second part 84 (PH2') which reports to the first eNodeB a value that differs from the value reported in FIG. 4 and includes a power headroom value from the second SIM. A power headroom report 86 that is transmitted by the dual connected first SIM to the second eNodeB includes a first part 88 (PH1') that reports the power head room of the communication to the first eNodeB by the first SIM and includes a power headroom value for the communication by the second SIM. The power headroom report 86 includes a second part 90 that reports the power headroom for the communications to the second eNodeB, which is the same information as reported in FIG. 4. The second SIM information is taken into account by including it in the value for the second eNodeB when reporting the power headroom report to the first eNodeB. The second SIM information is taken into account by including it in the value for the first eNodeB when reporting the power headroom report to the second eNodeB.

Figure 6:
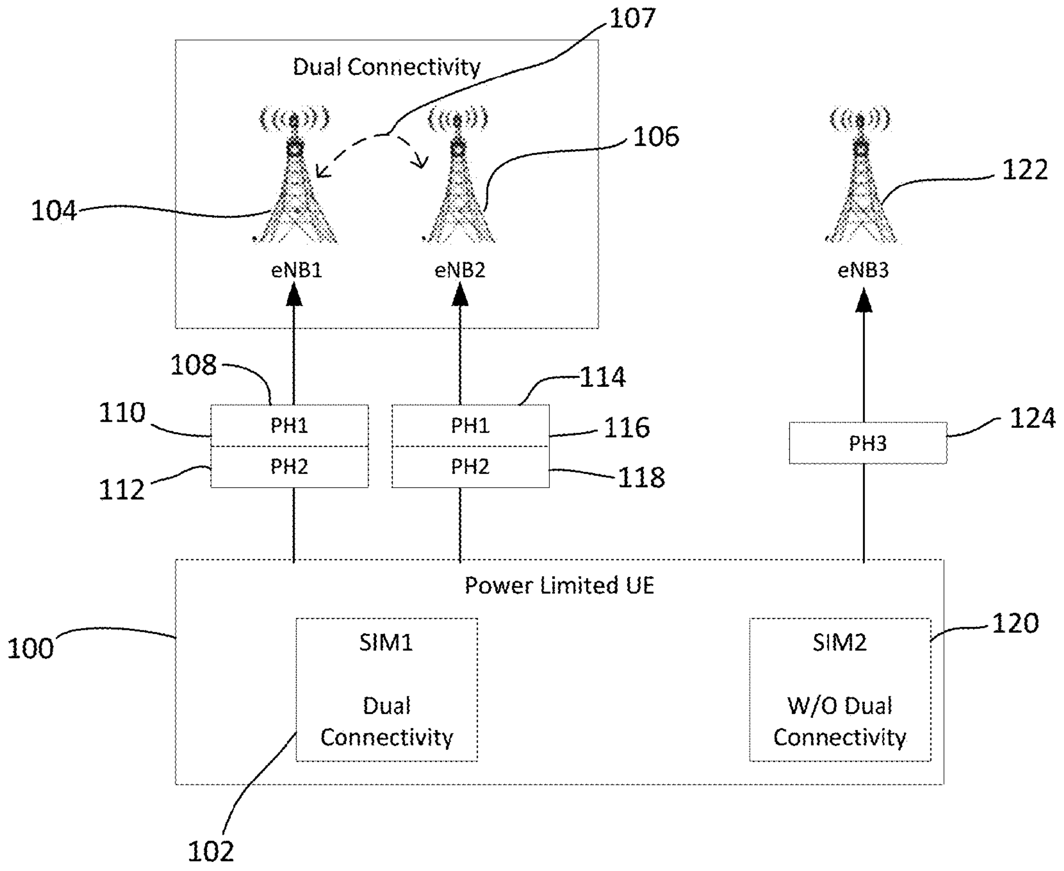
FIG. 6 is a functional block diagram showing power headroom reports being provided to eNodeBs from a user equipment having dual SIMs and dual connectivity.

FIG. 6 shows an example of power headroom reporting for a dual connectivity and dual SIM user equipment 100 without the present method and apparatus. The power limited user equipment 100 includes a first SIM 102 (SIM1) that provides dual connectivity to connect to two base stations 104 and 106 that are in the same network, as indicated by broken line 107. The first SIM 102 sends a power headroom report 108 to the first eNodeB 104 that includes a first part with a power headroom value 110 for the communication to the first eNodeB 104 and a second power headroom value 112 for the communication to the second eNodeB 106. The first SIM 102 also sends a power headroom report 114 to the second eNodeB 106 that includes a first part reporting the power headroom value 116 for the communications to the first eNodeB 104 and a second value 118 reporting the power headroom value for the communications to the second eNodeB 106.

A second SIM 120 is also present in the power limited user equipment 100. The second SIM communicates with a third eNodeB 122, using power for transmitting data which is not accounted for in the reporting to the by the first SIM 102. The second SIM 120 reports its available power in a power headroom report 124.

The values reported in the power headroom reports are as follows.

$$PH1(i)=P_{CMAX.1}(i)-P_{pusch.1}(i)$$

$$PH2(i)=P_{CMAX.2}(i)-P_{pusch.2}(i)$$

$$PH3(i)=P_{CMAX.3}(i)-P_{pusch.3}(i),$$

where i represents the sub-frame

The $P_{CMAX.1}$ value refers to the user equipment's maximum transmission power for the first channel. The $P_{pusch.1}$ refers to the power for the PUSCH (physical uplink shared channel) for the first channel. Corresponding values are provided for the second and third channels.

Figure 7:
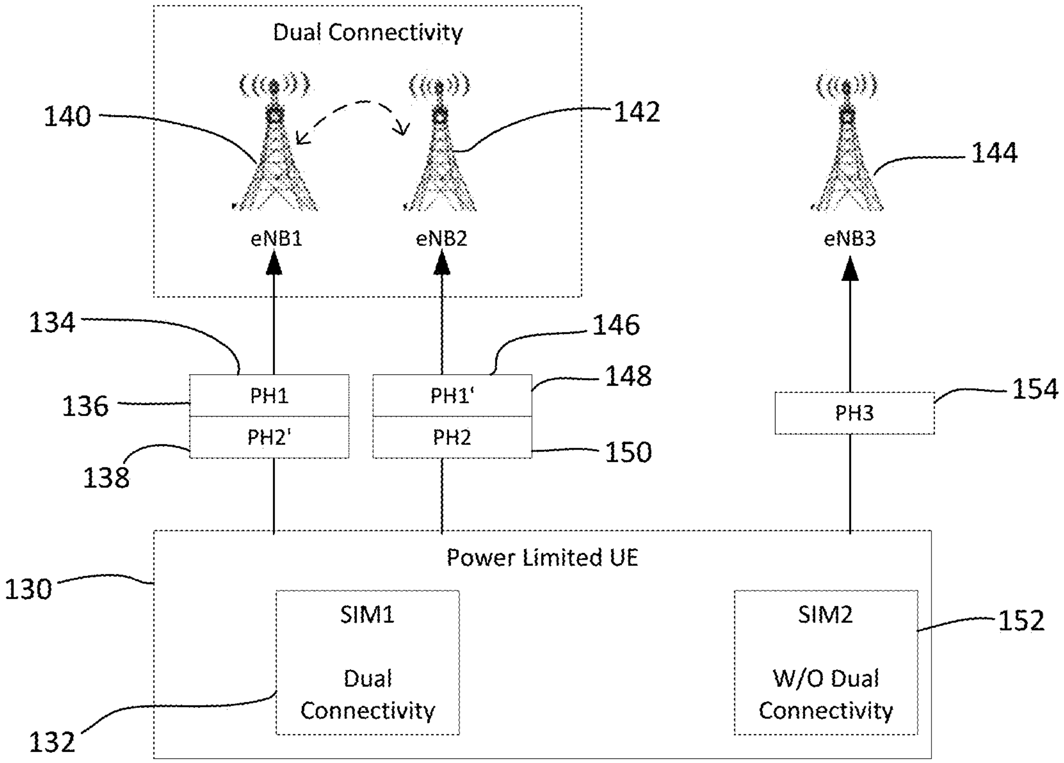
FIG. 7 is a functional block diagram showing modified power headroom reports for a user equipment having dual SIMs and dual connectivity.

Turning to FIG. 7, the user equipment 130 has a dual connectivity SIM 132 that provides a power headroom report 134 that includes a first part 136 and a second part 138. The second part 138 (PH2') which is sent to the first eNodeB 140 accounts for the power headroom of the connection to the second eNodeB 142 and of the connection to the third eNodeB 144. The first part 136 (PH1) reports only the power for the communication from the first SIM 132 to the first eNodeB 140. A power headroom report 146 includes a first part 148 (PH1') that accounts for the power headroom of the connection to the first eNodeB 140 and for the power headroom of the connection to the third eNodeB 144. A second part 150 (PH2) reports the power headroom for the communication to the second eNodeB 142. The second SIM 152 provides a power headroom report 154 to the third eNodeB of the power available for the second SIM to uplink data. The PH1' and PH2' values are calculated as follows.

$$PH1'(i)=P_{CMAX.1}(i)-P_{pusch.1}(i)-P_{pusch.3}(i)$$

$$PH2'(i)=P_{CMAX.2}(i)-P_{pusch.2}(i)-P_{pusch.3}(i),$$

where i represents the sub-frame.

In other words, the first power headroom value is calculated by subtracting not only the PUSCH power for the first channel (PUSCH.1) from the maximum transmit value for the first channel (CMAX.1) but also subtracting the PUSCH power for the third channel (PUSCH.3) from the maximum transmit value for the first channel. The second power headroom value is calculated by subtracting not only the PUSCH power for the second channel (PUSCH.2) from the maximum transmit value for the second channel (CMAX.2) but also subtracting the PUSCH power for the third channel (PUSCH.3) from the maximum transmit value for the second channel.

In the aspect shown in FIG. 7, the SIM 132 configures for dual connectivity, the method reuses the power headroom reporting methods that are already supported for dual connectivity. As part of the dual connectivity feature, the standards specify that the user equipment is to report the power headroom of all of the uplink carriers in the dual connectivity operation to both the master eNodeB and the secondary eNodeB. The eNodeB's scheduler has methods to account for the power used by the other eNB and the allocation pattern seen by the other eNodeB over an extended period of time. While reporting the power headroom to eNodeBs of the dual connectivity communication, by including (in one sense, hiding) the transmit power of the second SIM2 in the power headroom report of other eNodeB, both eNodeBs of the dual connectivity communication gets to know the actual power available at the user equipment.

Improvements in eNodeB scheduling for dual connectivity gets applied in dual SIM scenarios. The eNodeB's scheduling algorithm doesn't get effected because it already considers the scheduling of other eNodeB on the same SIM as part of dual connectivity and the scheduler performance with this method would be same as having one more serving cell in the other eNodeB.

According to a further aspect, when dual connectivity is not configured the power headroom report may also account for the second SIM. There may be less fluctuation in the power headroom report, resulting in a more stable link adaptation performance. In particular, the power headroom report includes an average transmit power as used by the other SIM. The average is taken only over the allocated sub frames. This may result in much lower fluctuations in the power headroom reported values as compared to using an instantaneous transmit power of the other SIM. This should provide better convergence in the eNodeB's scheduler.

As discussed above, in dual SIM scenarios when the user equipment has simultaneous uplink or uplink allocations done by two eNodeBs, the eNodeB link adaptation does not perform well as the uplink allocations and the transmit power requirements of the other SIM are not taken into account in the scheduling.

When dual connectivity is not configured, a modification of the legacy power headroom report is provided to improve link adaptation performance. In the legacy method, the power head room for the third eNodeB3 is calculated by the following equation.

$$PH3(i)=P_{CMAX.3}(i)-P_{pusch.3}(i),$$

i represents the subframe

In a certain aspect, the power headroom value reported to the third eNodeB may account the transmit power in the other SIM by subtracting the PUSCH values for the instantaneous transmit power in the other SIM according to the following equation.

$$PH3(i)=P_{CMAX.3}(i)-P_{pusch.3}(i)-P_{pusch.1}(i)-P_{pusch.2}(i)$$

But the allocation on the other SIM can fluctuate (in certain sub-frames there may not be any allocation), which can lead to the PH3 fluctuating possibly leading to a degraded link adaptation performance.

According to certain aspect, a method is provided to use an averaged transmit power on the other SIM (averaged over only the allocated sub frames and use an over estimating factor) to calculate PH3 value. The above equation is modified to indirectly indicate the transmit power required for the SIM1. The modified equations are represented below.

$$PH3'(i)=P_{CMAX.3}(i)-P_{pusch.3}(i)-f\{(P_{pusch.1\ Average}(i)+P_{pusch.2\ Average}(i)\}$$

Where $P_{pusch.1\ Average}(i)$ and $P_{pusch.2\ Average}{}^{(i)}$ are moving averages of PUSCH power on the first eNodeB1 and the second eNodeB2 in sub frame i.

The function '$f(\ )$' is to overestimate power on the other eNBs as shown below. For example, the over estimation may be 10%, although other values are also possible.

$$f[(P_{pusch.1\ Average}(i)+P_{pusch.2\ Average}(i)]=1.1\times[(P_{pusch.1\ Average}(i)+P_{pusch.2\ Average}(i)]$$

Figure 8:
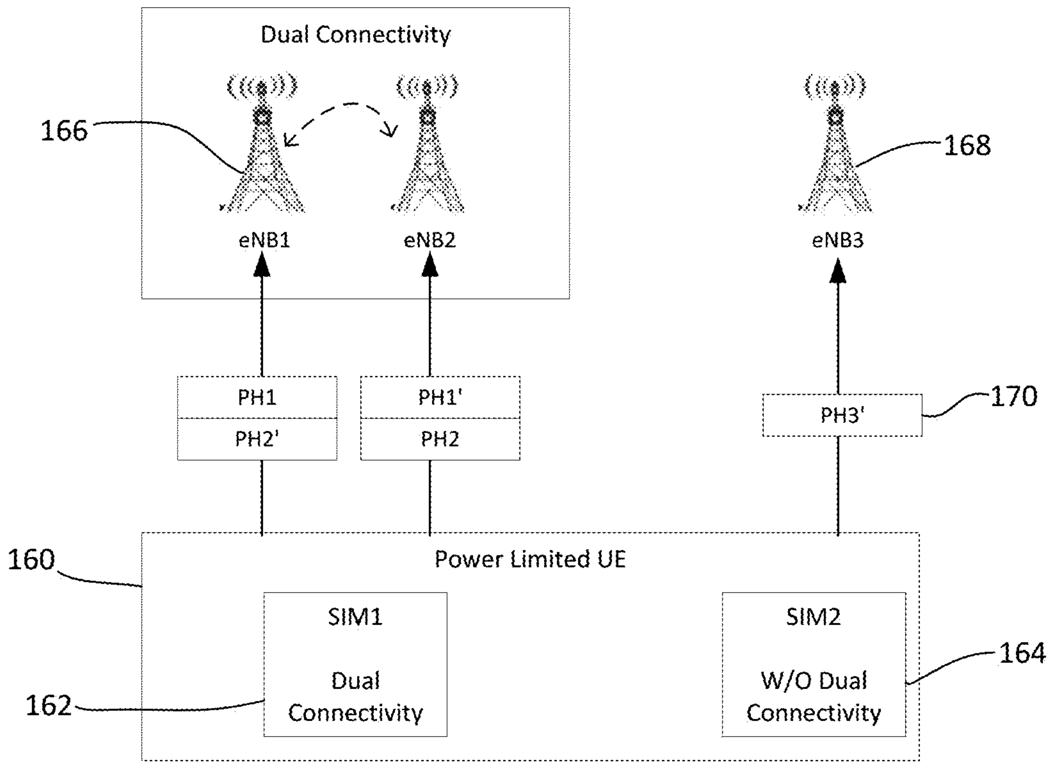
FIG. 8 is a functional block diagram showing modified power headroom reports for a user equipment having dual SIMs and dual connectivity according to a further aspect.

FIG. 8 shows an example of an aspect that includes a modified power headroom report from the second SIM. In particular, the user equipment 160 includes a first SIM 162 and a second SIM 164. The first SIM 162 may provide a single connection to a single eNodeB 166 and the second SIM 164 may provide a connection to an eNodeB 168. The second SIM 164 provides a power headroom report 170 (PH3') to the eNodeB 168 according to the foregoing. The first SIM 162 may be configured for a single connectivity or configured for dual connectivity.

Figure 9:
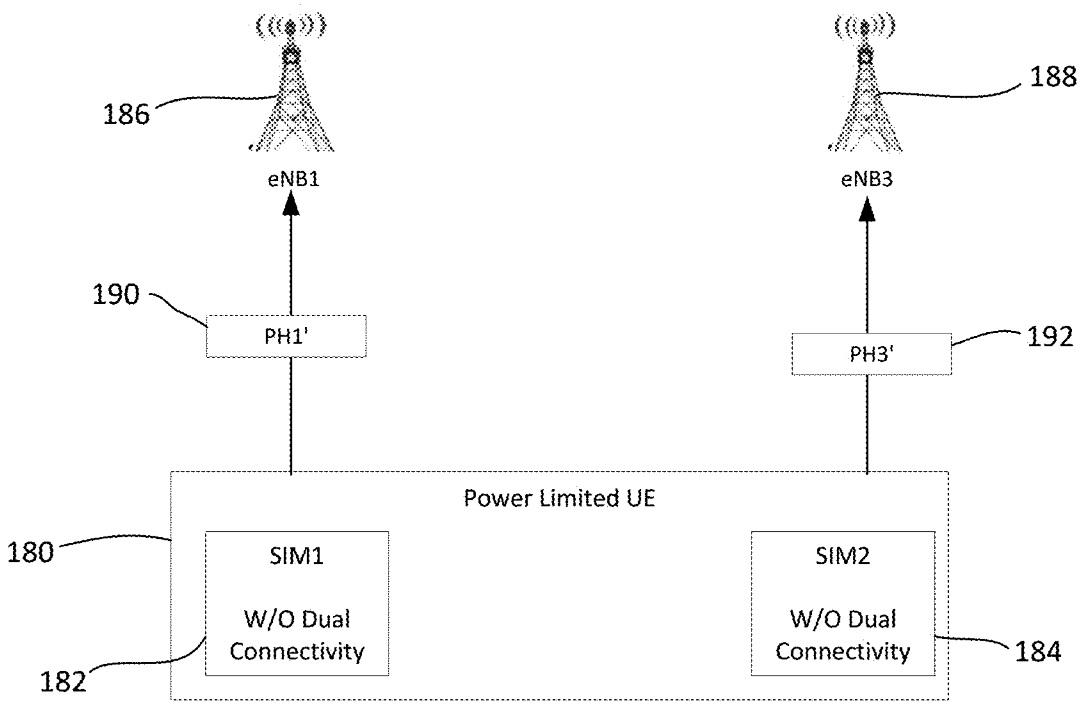
FIG. 9 is a functional block diagram showing modified power headroom reports for a user equipment having dual SIMs and single connectivity.

FIG. 9 provides a user equipment 180 having a first SIM 182 and a second SIM 184. The first SIM 182 connects to a first eNodeB or base station 186 and the second SIM 184 connects to the second eNodeB or base station 188. The user equipment 180 sends a power headroom report PH1' 190 to the base station 186. The user equipment 180 sends a power headroom report PH3' 192 to the base station 188. The power headroom report PH1' 190 and power headroom report PH3' 192 may be calculated by:

$$PH1'(i)=P_{CMAX.1}(i)-P_{pusch.1}(i)-P_{pusch.3}(i)$$

$$PH3'(i)=P_{CMAX.3}(i)-P_{pusch.3}(i)-P_{pusch.1}(i)-$$

The average values as noted above may be included in the calculation.

The advantages of the aspects methods may be considered in the following.

An example of the dual connectivity power headroom standard may be referred to as DualConnectivityPHR: (see reference section 6.1.3.6b TS 36.321). The DualConnectivityPHR MAC control element accommodates the PHR of all of the serving cells belonging to both the eNodeBs. The DualConnectivityPHR is sent to both the serving eNodeBs.

For dual SIM scenarios (without dual connectivity), the know solutions provide that the PHR (Power Headroom reports) to the two eNodeBs are sent independently without accounting for the transmissions in the other eNodeB. This results in a disadvantage that an incorrect assumption of the power headroom is made at the eNodeB scheduler. The eNodeB may assume availability of maximum transmit power at the user equipment and for transmit power limited user equipment, this will result in very frequent errors in uplinks.

Another scenario is to account for the instantaneous transmit power in the one SIM to modify the PHR of the other SIM. In the PHR report for one SIM, the transmit power used for the other SIM is subtracted. This results in the disadvantage of fluctuating PHR reports. If the instantaneous transmit power of one SIM is used that would lead to a lot of variation in the PHR, based on a coinciding allocation in the other SIM. This confuses the eNodeB scheduler and result in poor link adaptation performance.

In the present aspects, one or more of the above-noted disadvantages may be overcome. In the dual connectivity and dual SIM scenario, the transmit power of the other SIM may be incorporated into the power headroom reports while reporting on the dual connectivity headroom. The one sense, the transmit power of the other SIM may be hidden in the reports sent to both dual connectivity eNodeBs.

While reporting the PHR to the first eNB1, the PH2 (the report of serving cells belonging to the second eNodeB2) is modified to account for the transmission on the third eNodeB3. In a similar way, while reporting the PHR to the second eNodeB2, the PH1 (the report of the serving cell belonging to first eNodeB1) is modified. This will result in the first eNodeB1 and second eNodeB2 backing off on the size of the uplink grant. This will make the uplink transmission on all serving cells more reliable as the user equipment need not to back down on the power. The eNodeB scheduler is already optimized for link adaptation based on dual connectivity PHR. Performance in the first SIM1 will be the same as dual connectivity with one extra serving cell.

The same method can be extended to the other use cases, for example in which the second SIM2 is also configured with dual connectivity.

According to a first aspect, a method for reporting power headroom to a base station, comprising: establishing a first wireless connection between a user equipment and a first base station using a first subscriber identity module in the user equipment; establishing a further wireless connection between the user equipment and a further base station using a second subscriber identity module in the user equipment; calculating a first power headroom value for the user equipment to uplink to the first base station; calculating a further power headroom value for the user equipment to uplink to the further base station; generating a first power headroom report that includes the first power headroom value reduced by the further power headroom value; generating a further power headroom report that includes the further power headroom value; reporting the first power headroom report to the first base station; and reporting the further power headroom report to the further base station.

According to a second aspect, a method of the first aspect wherein the generating of the first power headroom report includes reducing the first power headroom value by an average of the further power headroom value over time.

According to a third aspect, a method according to the second aspect, wherein the generating of the further power headroom report includes the further power headroom value reduced by the first power headroom value.

According to a fourth aspect, a method according to the third aspect, wherein the generating of the further power headroom report includes the further power headroom value reduced by an average of the first power headroom value over time.

According to a fifth aspect, a method according to the fourth aspect, further comprising: overestimating the average power headroom value.

According to a sixth aspect, a method of the first aspect, wherein the first and second subscriber identity modules are configured for single connectivity.

According to a seventh aspect, a method of the first aspect, wherein the first subscriber identity module is configured for dual connectivity.

According to an eighth aspect, a method of the seventh aspect, further comprising: establishing a second wireless connection between the user equipment and a second base station using the first subscriber identity module in the user equipment; calculating a second power headroom value for the user equipment to uplink to the second base station; wherein the generating of the first power headroom report includes reducing the second power headroom value by the further power headroom value; generating a second power headroom report that includes the first power headroom value reduced by the further power headroom value; and reporting the second power headroom report to the second base station.

According to a ninth aspect, a method of the eighth aspect, wherein the first power headroom report includes the first power headroom value as a first reporting value and includes the second power headroom value reduced by the further power headroom value as a second reporting value; and wherein the second power headroom report includes the first power headroom value reduced by the further power headroom value as a first value and includes the second power headroom value as a second value.

According to a tenth aspect, an apparatus for wireless communication, comprising: a first subscriber identity module of a user equipment configured for wireless communication with a first base station; a second subscriber identity module of the user equipment configured for wireless communication with a further base station; and the user equipment being operable to generate a first power headroom report to the first base station and to generate a further power headroom report to the further base station, the first power headroom report reporting a first power headroom value for communicating using the first subscriber identity module reduced by a further power headroom value for communicating using the second subscriber identity module, the further power headroom report reporting the further power headroom value for communicating using the further subscriber identity module reduced by the first power headroom value for communicating using the first subscriber identity module.

According to an eleventh aspect, an apparatus of the tenth aspect, wherein the first subscriber identity module is configured for dual connectivity.

According to a twelfth aspect, an apparatus of the eleventh aspect, wherein the user equipment being operable to generate a first power headroom report for transmission to a first base station reporting a first power head room value and a second power headroom value, the second headroom value being reduced by the further power headroom value; wherein the user equipment being operable to generate a second power headroom report reporting a first power head room value reduced by the further power headroom value and reporting a second power headroom value.

According to a thirteenth aspect, a method for reporting power headroom in a dual connectivity and dual subscriber identity module user equipment, comprising: establishing a first wireless connection between a user equipment and a first base station using a first subscriber identity module in the user equipment; establishing a second wireless connection between the user equipment and a second base station using the first subscriber identity module in the user equipment; establishing a further wireless connection between the user equipment and a further base station using a second subscriber identity module in the user equipment; calculating a first power headroom value for the user equipment to uplink to the first base station; calculating a second power headroom value for the user equipment to uplink to the second base station; calculating a further power headroom value for the user equipment to uplink to the further base station; generating a first power headroom report that includes the first power headroom value and includes the second power headroom value reduced by the further power headroom value; generating a second power headroom report that includes the first power headroom value reduced by the further power headroom value and includes the second power headroom value; generating a further power headroom report that includes the further power headroom value; reporting the first power headroom report to the first base station; reporting the second power headroom report to the second base station; and reporting the further power headroom report to the further base station.

According to a fourteenth aspect, a method for reporting power headroom of a user equipment to a plurality of base stations, comprising: transmitting a first power headroom report to a first base station, the first power headroom report including a first power headroom value for uplinking to the first base station and a modified second power headroom value, the modified second power headroom value including a second power headroom value for uplinking to a second base station using a first subscriber identity module combined with a third power headroom value for uplinking to a third base station by a second subscriber identity module; and transmitting a second power headroom report to a second base station, the second power headroom report including a modified first power headroom value and a second power headroom value for uplinking to the second base station by the first subscriber identity module, the modified first power headroom value including a first power headroom value for uplinking to the first base station using the first subscriber identity module combined with the third power headroom value for uplinking to the third base station by the second subscriber identity module.

According to a fifteenth aspect, a method of the fourteenth aspect, wherein the third power headroom value is an average value over time.

According to a sixteenth aspect, an apparatus for reporting power headroom of a user equipment, comprising: first means for reporting power headroom to a first base station for wireless communication by a first subscriber identity module; second means for reporting power headroom to a further base station for wireless communication by a second subscriber identity module; the first means reporting power headroom reporting a power headroom value of the first subscriber identity module reduced by a power headroom value of the second subscriber identity module.

According to a seventeenth aspect, an apparatus of the sixteenth aspect, wherein the power headroom value of the second subscriber identity module is an average value over time.

According to an eighteenth aspect, an apparatus of the sixteenth aspect, wherein the first subscriber identity module is configured as a single connectivity subscriber identity module.

According to a nineteenth aspect, an apparatus of the sixteenth aspect, wherein the first subscriber identity module is configured as a dual connectivity subscriber identity module.

According to a twentieth aspect, an apparatus of the nineteenth aspect, further comprising: means for reporting power headroom to a second base station for wireless communication by the first subscriber identity module, the power headroom report to the second base station including a power headroom value for the wireless communication to the first base station reduced by the power headroom value for the wireless communication to the further base station.

According to a twenty-first aspect, an apparatus of the twentieth aspect, wherein the power headroom report by the means for reporting power headroom to the first base station includes the power headroom value for the wireless communication to the second base station reduced by the power headroom value for the wireless communication to the further base station. According to a twenty-second aspect, a computer readable media on which is stored software that is executable to perform the following method, comprising: transmitting a first power headroom report to a first base station, the first power headroom report including a first power headroom value for uplinking to the first base station and a modified second power headroom value, the modified second power headroom value including a second power headroom value for uplinking to a second base station using a first subscriber identity module combined with a third power headroom value for uplinking to a third base station by a second subscriber identity module; and transmitting a second power headroom report to a second base station, the second power headroom report including a modified first power headroom value and a second power headroom value for uplinking to the second base station by the first subscriber identity module, the modified first power headroom value including a first power headroom value for uplinking to the first base station using the first subscriber identity module combined with the third power headroom value for uplinking to the third base station by the second subscriber identity module.

According to a twenty-third aspect, a computer readable media on which is stored software that is executable to perform the following method, comprising: establishing a first wireless connection between a user equipment and a first base station using a first subscriber identity module in the user equipment; establishing a further wireless connection between the user equipment and a further base station using a second subscriber identity module in the user equipment; calculating a first power headroom value for the user equipment to uplink to the first base station; calculating a further power headroom value for the user equipment to uplink to the further base station; generating a first power headroom report that includes the first power headroom value reduced by the further power headroom value; generating a further power headroom report that includes the further power headroom value; reporting the first power headroom report to the first base station; and reporting the further power headroom report to the further base station.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A method for reporting power headroom to a base station, comprising:

establishing a first wireless connection between a user equipment and a first base station using a first subscriber identity module in the user equipment;

establishing a further wireless connection between the user equipment and a further base station using a second subscriber identity module in the user equipment;

calculating a first power headroom value for the user equipment to uplink to the first base station;

calculating a further power headroom value for the user equipment to uplink to the further base station;

generating a first power headroom report that includes the first power headroom value reduced by the further power headroom value;

generating a further power headroom report that includes the further power headroom value;

reporting the first power headroom report to the first base station; and reporting the further power headroom report to the further base station.

2. A method as claimed in claim 1, wherein the generating of the first power headroom report includes reducing the first power headroom value by an average of the further power headroom value over time.

3. A method as claimed in claim 2, wherein the generating of the further power headroom report includes the further power headroom value reduced by the first power headroom value.

4. A method as claimed in claim 3, wherein the generating of the further power headroom report includes the further power headroom value reduced by an average of the first power headroom value over time.

5. A method as claimed in claim 4, further comprising: overestimating the average power headroom value.

6. A method as claimed in claim 1, wherein the first and second subscriber identity modules are configured for single connectivity.

7. A method as claimed in claim 1, wherein the first subscriber identity module is configured for dual connectivity.

8. A method as claimed in claim 7, further comprising:

establishing a second wireless connection between the user equipment and a second base station using the first subscriber identity module in the user equipment;

calculating a second power headroom value for the user equipment to uplink to the second base station;

wherein the generating of the first power headroom report includes reducing the second power headroom value by the further power headroom value;

generating a second power headroom report that includes the first power headroom value reduced by the further power headroom value; and reporting the second power headroom report to the second base station.

9. A method as claimed in claim 8, wherein the first power headroom report includes the first power headroom value as a first reporting value and includes the second power headroom value reduced by the further power headroom value as a second reporting value; and wherein the second power headroom report includes the first power headroom value reduced by the further power headroom value as a first value and includes the second power headroom value as a second value.

10. An apparatus for wireless communication, comprising:

a first subscriber identity module of a user equipment configured for wireless communication with a first base station;

a second subscriber identity module of the user equipment configured for wireless communication with a further base station; and the user equipment being operable to generate a first power headroom report to the first base station and to generate a further power headroom report to the further base station, the first power headroom report reporting a first power headroom value for communicating using the first subscriber identity module reduced by a further power headroom value for communicating using the second subscriber identity module, the further power headroom report reporting the further power headroom value for communicating using the further subscriber identity module reduced by the first power headroom value for communicating using the first subscriber identity module.

11. An apparatus as claimed in claim 10, wherein the first subscriber identity module is configured for dual connectivity.

12. An apparatus as claimed in claim 11, wherein the user equipment being operable to generate a first power headroom report for transmission to a first base station reporting a first power head room value and a second power headroom value, the second headroom value being reduced by the further power headroom value;

wherein the user equipment being operable to generate a second power headroom report reporting a first power head room value reduced by the further power headroom value and reporting a second power headroom value.

13. A method for reporting power headroom in a dual connectivity and dual subscriber identity module user equipment, comprising:

establishing a first wireless connection between a user equipment and a first base station using a first subscriber identity module in the user equipment;

establishing a second wireless connection between the user equipment and a second base station using the first subscriber identity module in the user equipment;

establishing a further wireless connection between the user equipment and a further base station using a second subscriber identity module in the user equipment;

calculating a first power headroom value for the user equipment to uplink to the first base station;

calculating a second power headroom value for the user equipment to uplink to the second base station;

calculating a further power headroom value for the user equipment to uplink to the further base station;

generating a first power headroom report that includes the first power headroom value and includes the second power headroom value reduced by the further power headroom value;

generating a second power headroom report that includes the first power headroom value reduced by the further power headroom value and includes the second power headroom value;

generating a further power headroom report that includes the further power headroom value;

reporting the first power headroom report to the first base station;

reporting the second power headroom report to the second base station; and reporting the further power headroom report to the further base station.

* * * * *